United States Patent [19]

Curto et al.

[11] Patent Number: 5,185,726
[45] Date of Patent: Feb. 9, 1993

[54] CONTINUOUSLY-FILLED FLOATATION APPARATUS

[75] Inventors: Rick A. Curto, Friendswood; Otis A. Johnston, League City, both of Tex.

[73] Assignee: Western Atlas International, Inc., Houston, Tex.

[21] Appl. No.: 568,248

[22] Filed: Aug. 15, 1990

[51] Int. Cl.$^5$ .............................. G01V 1/38
[52] U.S. Cl. ...................... 367/18; 367/20; 367/106; 367/130; 367/144; 114/245
[58] Field of Search ............ 367/18, 20, 106, 130, 367/144, 154, 159, 171, 169; 114/244, 245

[56] References Cited

U.S. PATENT DOCUMENTS

| | | | |
|---|---|---|---|
| 3,794,965 | 2/1974 | Charske | 367/18 |
| 4,745,583 | 5/1988 | Motal | 367/18 |

*Primary Examiner*—J. Woodrow Eldred
*Attorney, Agent, or Firm*—Paul S. Madan

[57] ABSTRACT

The invention provides a floatation apparatus for maintaining a longitudinal object at a constant depth below the water surface in a body of water. Several airtight chambers are connected in a serial connection to form a string of air tight chambers. A one-way check valve is installed in the chamber at one end of the string while the other end chamber is connected to a nose piece. Air is continuously supplied to the check valve connected to the end chamber. A separate one-way check valve is installed between each pair of adjacent chambers in the string in a manner that air can pass between only in the direction from the air source to the nose member. The floatation apparatus is pivotaly connected to the longitudinal object at more than one place by means of parallel links. When the assembly of the floatation apparatus and the longitudinal object is placed in a body of water and towed behind a vessel, the floatation apparatus maintains the object at a constant depth and in a near straight-line position below the water surface.

8 Claims, 3 Drawing Sheets

CONTINUOUSLY-FILLED FLOATATION APPARATUS

BACKGROUND OF THE INVENTION

1. Field of the Invention

This invention relates to a floatation apparatus and more particularly to a continuously-filled buoy for maintaining an object at a near constant depth below the surface of a body of water.

2. Background of the Invention

In marine seismic surveying, to obtain geophysical information relating to the substrata located below the sea bottom, acoustic transmitters adapted to produce pressure pulses or shock waves under water are towed beneath the water surface behind a marine vessel. The shock waves propagate into the substrata beneath the sea where they are refracted and reflected back to the sea. The returning shock waves are detected by sensors (usually hydrophones) and the useful data contained in the signals produced by the sensors is processed to determine the geophysical structure of the substrata.

Air guns or gas guns are frequently used as acoustic transmitters. During seismic surveying, several air guns are placed in spaced relation to each other in a subarray. One or more air gun subarrays are towed beneath the sea surface to produce desired pressure pulses. The pressure pulse characteristics of each air gun along with its relationship to the other guns in the subarray determine the characteristics of the pressure pulses produced, such as frequency, bubble ratio and amplitude.

In order to produce and transmit accurate pressure pulses having known characteristics, it is important that the air gun subarray is maintained at a constant depth below the water surface and in a near straight line horizontal position. Air gun subarrays presently in use are generally more than fifty (50) feet long and weigh several hundred pounds. To keep such air gun subarrays at a constant depth below the water surface, it is a common practice in the art of seismic surveying to pivotly attach a single buoy along the length of the air gun subarray by means of parallel links. The buoy maintains the air gun subarray at or near a constant depth below the water surface when the subarray and buoy are towed behind a vessel.

U.S. Pat. No. 4,686,660 to Gjestrum et al. issued Aug. 11, 1987, discloses one such buoy, which contains several discrete float chambers disposed in longitudinal spaced relation inside a tubular sleeve member. In the alternative, the discrete float chambers may be secured together longitudinally or they may be connectable lengths of a sleeve. However, regardless of the manner in which the discrete float chambers are used to form the buoy, they are not in fluid (generally air) communication with each other and thus, must be pressurized with air prior to use. Once such a buoy is deployed, no means exist to refill any of the chambers should an air leak occurs without shutting down the entire operation and pulling the subarray and the buoy onto the vessel for repair or replacement. Such prior art pre-airfilled discrete chambers have frequently failed even due to minor air leaks over a period of time causing a portion of the air gun subarray to sag, which distorts the relative positioning of the air guns thereby causing distorted pressure pulses to be produced which, of course, is highly undesirable.

The equipment utilized for seismic surveying includes, among other things, air gun subarrays, seismic cables, data acquisition and processing equipment, and a marine vessel. The total cost of the entire equipment can easily exceed fifteen (15) million dollars. Due to the high cost of the equipment and the logistics of conducting seismic surveying offshore, the surveying activity is usually performed around the clock for several days at a time, except for the time it takes to change crews between working shifts or due to equipment failure. Since there exist no means to replenish the air in the discrete chambers should a leak occur, any failure relating to such a buoy will either require shutting down the surveying activity to pull the buoy and the air gun on the vessel or result in obtaining inaccurate seismic data. Neither of these alternatives is, of course, acceptable. Therefore, it is highly desirable to have a reliable buoy or floatation system for use in marine seismic surveying whose performance is unaffected by air leaks.

The present invention addresses the problems associated with the prior art floatation devices and provides a floatation device which is substantially unaffected by air leaks.

SUMMARY OF THE INVENTION

A floatation apparatus for maintaining an object at a constant depth below the water surface in a body of water is disclosed. The floatation apparatus contains in a series connection a plurality of chambers. Air under pressure is continuously supplied to the chamber at one end in the series. A separate low pressure threshold one-way pressure check valve is installed between each pair of adjacent chambers in a manner such that air can pass only in the direction from the chamber receiving the air to the chamber at the other end in the series. The floatation apparatus is pivotly attached to the object by parallel links. When the object attached to the floatation apparatus is placed in water and towed behind a vessel, the floatation apparatus maintains the object at a constant depth.

Examples of the more important features of the invention thus have been summarized rather broadly in order that the detailed description thereof that follows may be better understood, and in order that the contributions to the art may be better appreciated. There are, of course, additional features of the invention that will be described hereinafter and which will form the subject of the claims appended thereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

Figure 1:
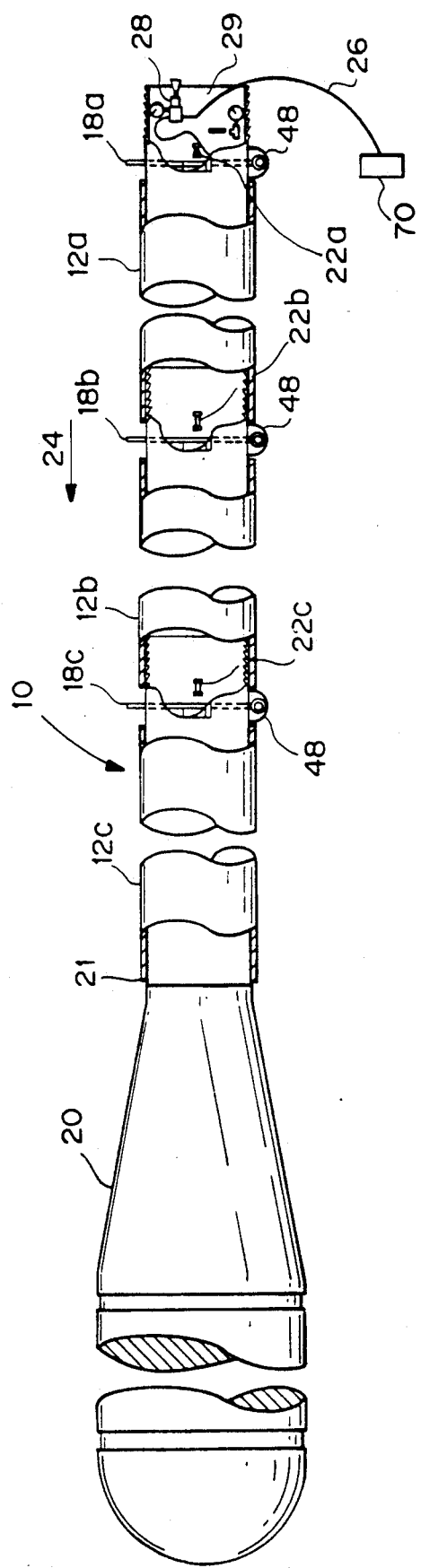
FIG. 1 shows a partial cross-sectional view of the continuously- filled floatation device of the present invention.

FIG. 1 shows the floatation device of the present invention. It contains in a serial connection several airtight chambers for housing a fluid under pressure, usually air. The chambers are sealingly separated from each other by baffle plates. A separate low pressure threshold one-way check valve is provided for each chamber for passing air from a common air source from the first chamber to the last chamber only in one direction and preventing any air flow between the chambers in the opposite direction.

The floatation device as shown in FIG. 1 is a continuously filled buoy 10, which contains in a serial connection three chambers 12a–c. Although FIG. 1 shows three chambers, the actual number, diameter and length of the chambers will depend upon the specific application for which the floatation device is designed.

A baffle plate 18a seals the outside of the first chamber 12a while baffle plates 18b and 18c sealingly separate adjacent chambers 12a and 12b, and chamber 12b from 12c respectively. The outside end of the last chamber 12c may be open or closed, but in either case is sealingly connected to the end 21 of a nose member 20. A separate one-way pressure check valve from a group of valves 22a–c having a relatively low threshold (about one-third of a psi) is sealingly placed in each baffle plate in such a way that air can flow into each chamber only in the direction from the first to the last chamber while preventing any airflow in the opposite direction. In the structure of FIG. 1, air can flow only in the direction indicated by the arrow 24.

Figure 2:
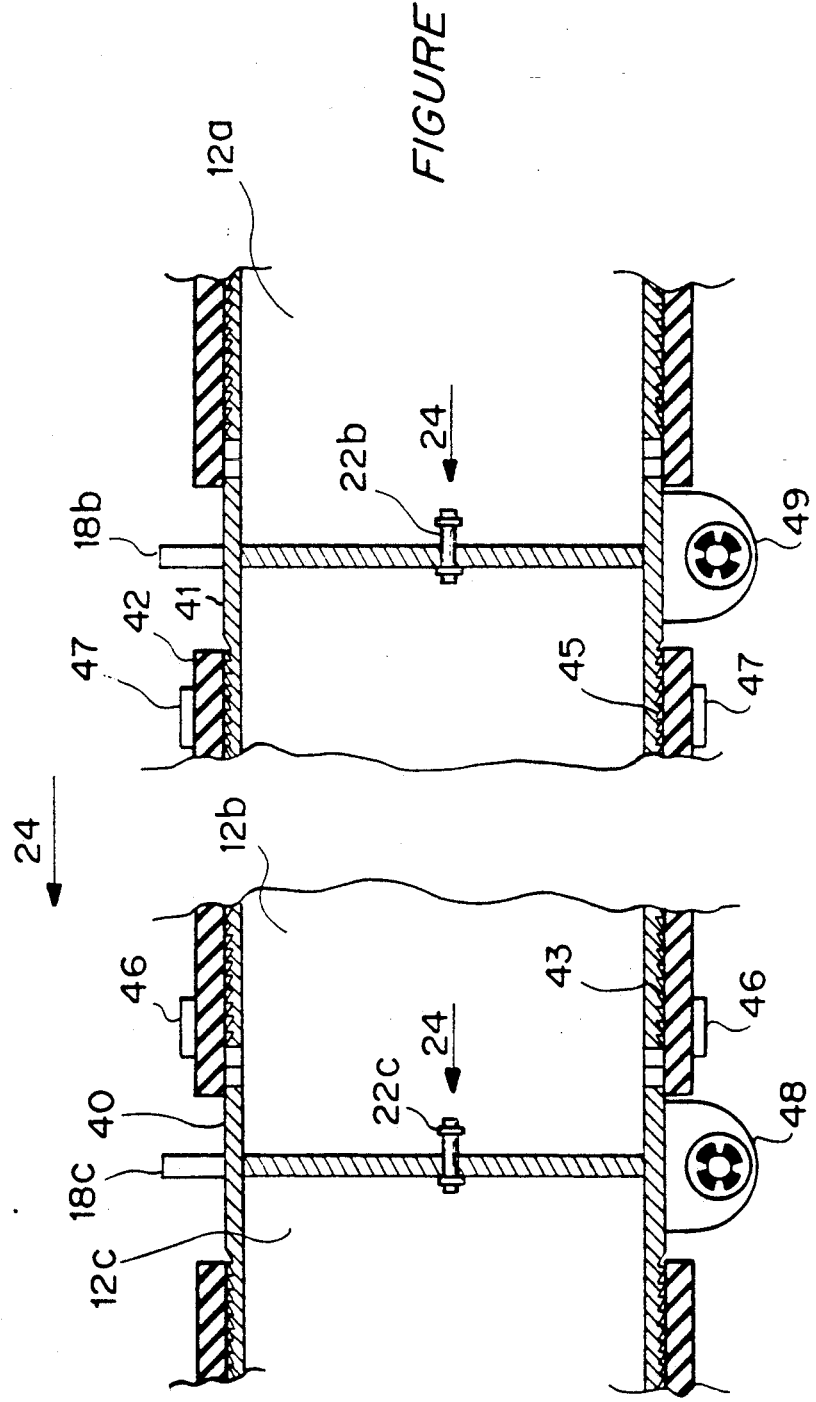
FIG. 2 shows a sectional view of a chamber of the floatation device of FIG. 1.
Figure 3:
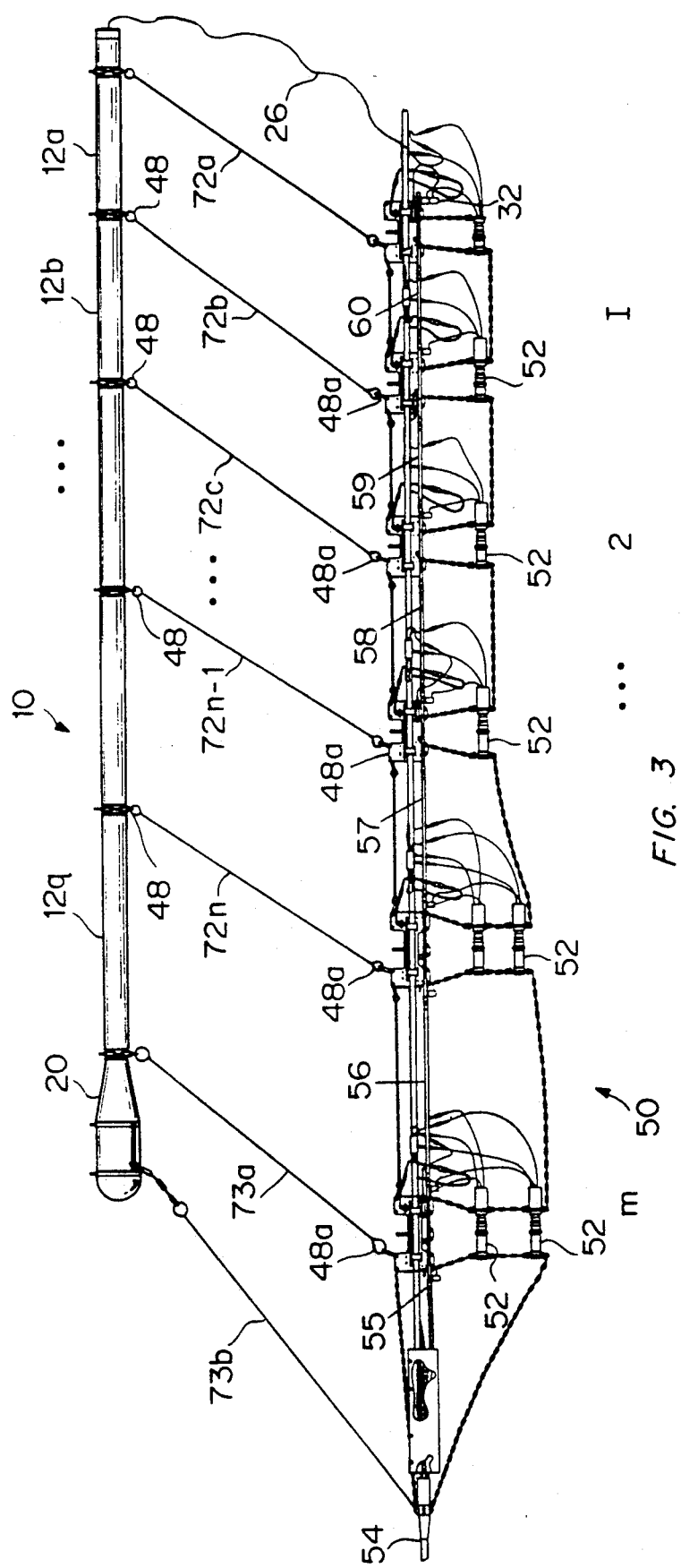
FIG. 3 shows the continuously-filled floatation device of the present invention pivotly attached to a transmitter subarray.

The construction of individual chambers will now be described in more detail while referring to FIG. 2, which shows the cross-section of a typical air chamber such as 12b. The air chamber 12b is made by joining cylindrical members 40 and 41 by a hose member 42. The members 40 and 41 contain serrations 43 and 45 on their respective outside surfaces. One end of the hose 42 is snugly placed over the serrations 43 of the cylindrical member 40 and the other end over the serration 45 of the cylindrical member 41 to form an airtight chamber 12b. Clamps 46 and 47 may be placed over the hose above the serrations to positively lock the hose 42 to the cylindrical members 40 and 41. Clamps 48 and 49 are provided on the cylindrical members 40 and 41 respectively for pivotly attaching links 72 (FIG. 3) thereto. The cylindrical members 40 and 41 and baffleplates 18b and 18c are preferably made of metal and are made strong enough to support the weight of the air gun subarray 50 (FIG. 3). As noted earlier, check valves 22b–22c are installed in the baffle plates 18b and 18c respectively, which enable the air to flow from chamber 12a to 12b and from chamber 12b to 12c but not in the opposite direction. In this manner, any number of airtight chambers 12 may be constructed in a series.

Now referring back to FIG. 1, when the floatation device 10 is used to maintain an air gun subarray at a constant depth below the water surface, an air source (not shown) is present on the marine vessel from which high pressure air is supplied to each air gun. The same air source is used to continuously supply air to the floatation device 10 via a hose 26. The high pressure air is first supplied to a regulator valve 28, which steps down and maintains the air pressure at its output end at a predetermined low pressure level, about ten (10) psi. The low pressure air is supplied from the regulator valve to the first chamber 12a through the check valve 22a placed in the first baffle plate 18a by means of a hose 32. The regulator 28, hose 32 and any other elements needed to supply air to the floatation device 10 may easily be placed in a cylindrical section 29 attached to the first chamber 12b.

As noted earlier, to fill the floatation device 10 with air, low pressure air is supplied to the first chamber 12a via check valve 22a. When the pressure in the first chamber 12a builds up to a level that is greater than the threshold pressure of the second check valve 22b installed in the second baffle plate 18b between the first and the second chamber, the check valve 22b opens and enables the air to flow from the first chamber 12a to the second chamber 12b. This process continues until all of the check valves 22a–c are open. Each chamber continues to receive air until the pressure difference between the preceding and the succeeding chamber is equal to or less than the check-valve threshold pressure, thus, filling each chamber with air to about ten (10) psi. Once air has entered in a chamber, the check valve being a one-way type will not allow any air to flow from that chamber to its preceding chamber. The check valve between each pair of adjacent chambers remains closed as long as the air pressure in the succeeding chamber in the sequence does not fall below the pressure in the preceding chamber by more than the threshold of the check valve present between them, which is about one-third of a psi. For example, the check valve 22b will not open unless the pressure in chamber 12b is greater than the pressure in chamber 12b by more than one-third of a psi. Similarly, the check valve 22a will remain open as long as the pressure difference between the regulator valve and the first chamber 12a remains below the threshold level of the check valve 12a.

FIG. 3 shows the use of the floatation device of FIG. 1 containing a number of chambers with an air gun subarray 50. The air gun subarray 50 contains a number of air gun sections, sections I through M, each containing one or more air guns 52. High pressure air, usually at several hundred psi, is supplied from an air source stationed at the vessel to the subarray at an inlet port 54, which in turn is connected to pipe made up by serially connecting sections 55–60. Air to each air gun is fed from sections 55–60. The last air pipe section 60 is connected to a cut-off valve 70, which in turn is connected to the regulator valve 28 via the hose 26 shown in FIG. 1. In this manner, a common air source may be used to supply high pressure air to the air guns 52 and low pressure air to the floatation device 10. The floatation device 10 is pivotly connected to the air gun subarray 50 by links 72a–n. One end of each link in the group 72a–n is pivotly connected to the floatation device 10 at a suitable place, such as clamps 48 and the like, while the other end is pivotly connected to the air gun subarray 50 at a suitable place such as clamps 48a. The nose member 20 is pivotly connected to the air gun by links 73a and 73b.

During marine seismic surveying, the air gun subarray 50 and the floatation device 10, as shown in FIG. 3, are placed in a body of water, usually the sea, and towed behind a vessel. As discussed earlier, the air gun subarray normally is used continuously for several days at a time. If a minor air leak develops in an air chamber, for example in chamber 12c, the air pressure in it will start decreasing, causing the pressure difference between chambers 12b and 12c to exceed the check valve threshold pressure. The check valve 22c between chambers 12b and 12c will then open, allowing air to flow from chamber 12b to 12c. At some point, when the pressure in chamber 12b has become low enough, air from chamber 12a will start flowing into the chamber 12b thereby decreasing the pressure in chamber 12a. Eventually, air from the regulator valve 26 will be supplied to the air chambers 12a-12c. In this manner, each chamber will continue to receive any air that it may have lost due to an air leak. When a persistent air leak develops in a chamber, all chambers placed between the leaking chamber and the first chamber will continue to receive air from the regulator 28 and thereby maintain the desired pressure. Only major air leaks in any of the air chambers 12a-c, which occur very infrequently, may require pulling the floatation device 10 on to the vessel for repair or replacement. Thus, the buoyant characteristics of the continuously-filled floatation device 10 are substantially unaffected by air leaks which may develop during operation.

The foregoing description is directed to a particular embodiment of the invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

We claim:

1. A floatation device comprising:
   (a) a tubular member which is divided to form in a serial connection a plurality of airtight chambers, the chamber at one end of the tubular member being referred to as the first chamber while the chamber at the other end as the last chamber;
   (b) a first one-way fluid check valve installed in the first chamber for passing a fluid therethrough in to the first chamber; and
   (c) a separate one-way check valve installed between each pair of adjacent chambers in said plurality of chambers in a manner which will enable the fluid from the first chamber to pass to the last chamber.

2. A floatation apparatus comprising:
   (a) a nose member;
   (b) a plurality of airtight chambers placed in a series connection to form a string, the chamber at one end of the string being referred to as the first chamber while the chamber at the other end as the last chamber, said last chamber connected to the nose member;
   (c) an air source connected to the first chamber for supplying air under pressure thereto;
   (d) a separate one-way check valve placed between each pair of adjacent chambers in the string in a manner which enables the air to pass from one chamber to the next in the direction from the first to the last chamber.

3. The apparatus of claim 2 wherein a one-way check valve is installed in the first chamber and the air source is connected thereto for passing air under pressure to the first chamber.

4. A floatation apparatus for use in seismic surveying comprising:
   (a) a nose member;
   (b) a plurality of airtight chambers rigidly connected to form a string, the chamber at one end of the string being referred to as the first chamber while the chamber at the other end as the last chamber, said last chamber connected to the nose member;
   (c) a first one-way check valve having a low pressure threshold connected to the first chamber;
   (d) a separate one-way check valve having a low pressure threshold placed between each pair of adjacent chamber in said string in a manner which enables the air to pass from the first to the last chamber; and
   (e) a regulator valve connected to the first check valve for supplying air under pressure to the first chamber.

5. An apparatus for use in marine seismic surveying comprising:
   (a) a seismic transmitter subarray having a plurality of transmitters connected to each other in a spaced relationship, each transmitter receiving high pressure fluid and in response thereto producing pressure pulses;
   (b) a longitudinal floatation device pivotly connected to the subarray, the floatation device having:
      (i) a plurality of airtight chambers rigidly connected to each other to form a string, the chamber at one end of the string being referred to as the first chamber while the chamber at the other end as the last chamber;
      (ii) a first one-way fluid check valve installed in the first chamber for passing a low pressure fluid therethrough to the first chamber;
      (iii) a separate check valve installed between each pair of adjacent chambers in the string in a manner which will enable the fluid from the first chamber to pass to the last chamber; and
      (iv) means for converting the high pressure fluid to a low pressure fluid and supplying the low pressure fluid to the first check valve.
   (c) the transmitter subarray pivotly connected to said tubular member by a plurality of spaced-apart parallel link members to form a single assembly.

6. The apparatus of claim 5 wherein said transmitters are air guns and said fluid is air.

7. A floatation device, comprising:
   (a) a plurality of airtight chambers placed in a series connection to form a string, the chamber at one end of the string being referred to as the first chamber while the chamber at the other end as the last chamber;
   (b) a fluid supply line connected to the first chamber for supplying fluid thereto;
   (c) a one-way check valve connected between each pair of adjacent chambers in said plurality of chambers, each valve enabling the fluid to pass between the chambers in the pair of adjacent chambers associated with each such valve in the direction from the first to last chamber when the pressure in the chamber in such adjacent pair that is near the first chamber exceeds the pressure in the other chamber by a predetermined amount.

8. An apparatus for use in marine seismic surveying, comprising:
   (a) a seismic transmitter subarray having a plurality of transmitters placed in a spaced relationship, said transmitters receiving high pressure fluid and in response thereto producing pressure pulses;
   (b) a longitudinal floatation device pivotally connected to the subarray, the floatation device having:
      (i) a plurality of airtight chambers connected to each other to form a string, the chamber at one end of the string being referred to as the first chamber while the chamber at the other end as the last chamber;

(ii) a fluid supply line connected to the first chamber for supplying a low pressure fluid to the first chamber; and
(iii) a separate check valve placed between each pair of adjacent chambers in the string, each check valve enabling the fluid to pass between the chambers in the pair of adjacent chambers associated with each such valve in the direction from the first to last chamber when the pressure in the chamber in such adjacent pair that is near the first chamber is greater than the pressure in the other chamber by a predetermined amount.

* * * * *